(12) United States Patent
Cottingham, III et al.

(10) Patent No.: US 7,750,496 B2
(45) Date of Patent: Jul. 6, 2010

(54) POWER SUPPLY UNIT FOR USE WITH AN AIRCRAFT ELECTRICAL SYSTEM

(75) Inventors: John D. Cottingham, III, Anderson, SC (US); Scott A. Davis, Pickens, SC (US); James R. Berliner, Easley, SC (US); Robert A. Lockmiller, Pickens, SC (US)

(73) Assignee: Champion Aerospace LLC, Liberty, SC (US)

( * ) Notice: Subject to any disclaimer, the term of this patent is extended or adjusted under 35 U.S.C. 154(b) by 0 days.

(21) Appl. No.: 12/052,821

(22) Filed: Mar. 21, 2008

(65) Prior Publication Data

US 2008/0238191 A1 Oct. 2, 2008

Related U.S. Application Data

(60) Provisional application No. 60/908,148, filed on Mar. 26, 2007.

(51) Int. Cl.
*H02H 3/00* (2006.01)
*B60L 1/00* (2006.01)

(52) U.S. Cl. ............................. 307/9.1; 307/66; 307/87

(58) Field of Classification Search .................. 307/9.1, 307/10.1, 44, 48, 64, 66, 85–87
See application file for complete search history.

(56) References Cited

U.S. PATENT DOCUMENTS

| 4,581,571 | A | | 4/1986 | Hansen | |
|---|---|---|---|---|---|
| 5,850,113 | A | * | 12/1998 | Weimer et al. | ................ 307/64 |
| 6,384,491 | B1 | | 5/2002 | O'Meara | |
| 6,741,896 | B1 | * | 5/2004 | Olzak et al. | .................... 307/66 |

FOREIGN PATENT DOCUMENTS

WO WO97/21265 6/1997

OTHER PUBLICATIONS

UK Search Report for GB0805472.8, Jul. 10, 2008, 1 page.

* cited by examiner

*Primary Examiner*—Fritz M Fleming
(74) *Attorney, Agent, or Firm*—Reising Ethington P.C.

(57) ABSTRACT

A power supply unit that provides uninterrupted power to an aircraft power bus during switchovers of the aircraft bus from one power source to another. The power supply unit includes circuitry to distinguish between loss of bus power due to switchovers between power sources and loss of bus power due to shutdown of the aircraft. The power supply unit includes a low voltage lockout circuit to interrupt the supply of power when the aircraft bus voltage falls below a minimum value.

15 Claims, 2 Drawing Sheets

POWER SUPPLY UNIT FOR USE WITH AN AIRCRAFT ELECTRICAL SYSTEM

CROSS-REFERENCE TO RELATED APPLICATION

This application claims the priority of U.S. Provisional Application No. 60/908,148, filed Mar. 26, 2007, the entire contents of which are hereby incorporated by reference.

TECHNICAL FIELD

This invention relates generally to power supplies and, more specifically, to power supplies used onboard aircrafts to provide uninterrupted power during temporary power disruptions.

BACKGROUND OF THE INVENTION

Aircraft electrical power typically comes from different sources depending on whether the aircraft is on the ground, preparing for takeoff, or in flight. For instance, when the aircraft is on the ground and parked at a terminal, electrical power is usually provided via a removable power cable that connects the aircraft to a ground power source. This ground power source typically provides the aircraft with AC power that is subsequently converted to DC power by rectifying equipment located on the aircraft. As the aircraft prepares for takeoff, the ground power source is unplugged and an auxiliary power unit (APU) is switched on by a contactor to provide the aircraft electrical system with power. The APU is preferably a self-contained generator that runs off a combustion or gas turbine engine and is designed to provide the aircraft with electrical power during periods when the main aircraft engines are turned off. Generating power with the APU, as opposed to an engine generator (which requires operation of an aircraft main engine), saves fuel and wear-and-tear on the engine. Once the main engines are turned on, power generation transfers from the APU to one or more engine generators which provide the aircraft with electrical power throughout the remainder of the flight. After the aircraft has landed and parked, it may be desirable to turn off the aircraft electrical system by switching contactor to an 'off' state.

As is known by those skilled in the art, some contactors operate on a 'break-before-make' principal. In this arrangement, when the contactor switches between the various power sources there is a temporary interruption in the electrical power supplied to the aircraft electrical system. This temporary interruption, which usually only lasts a few milliseconds to several hundred milliseconds, can cause some of the aircraft's electronics to turn off, reset, and/or erase information that has already been programmed, to name but a few ramifications.

SUMMARY OF THE INVENTION

In accordance with one aspect of the invention, there is provided a power supply unit for use with an aircraft power bus. The power supply unit includes a connection circuit that electrically connects the aircraft power bus and an energy storage circuit being electrically coupled to the connection circuit. The connection circuit provides both charge and discharge paths between the aircraft bus and the energy storage circuit. During charging periods the energy storage circuit receives charge from the aircraft power bus through the charge path, and during discharging periods the energy storage circuit provides charge to the aircraft power bus through the discharge path.

In accordance with another aspect of the invention, there is provided a power supply unit for use with an aircraft power bus in which voltage differences between two nodes located at opposite ends of an impedance are used to control a switch that controls the supply of power from the unit. The power supply includes a connection circuit and energy storage circuit. The connection circuit has positive and negative input terminals for connecting to two corresponding terminals of the aircraft power bus. The energy storage circuit is electrically connected to the connection circuit. The connection circuit provides separate charging and discharging paths between the input terminals and the energy storage circuit. The connection circuit includes an impedance in the charging path and a switch in the discharge path. By monitoring voltages differences between two nodes located at opposite ends of the impedance, the power supply unit can control operation of said switch to either enable or inhibit the supply of power from the unit to the aircraft bus.

The power supply unit can be used to provide uninterrupted power to the aircraft bus during switchover of aircraft power between different sources. The power supply unit can include a number of optional circuits if desired, such as a timer delay circuit that distinguishes between loss of aircraft bus power due to switchovers and that due to shutting down of the plane after use. Another optional circuit is a low voltage lockout that inhibits the power supply unit from supplying power to the aircraft bus once the bus voltage falls below a certain minimum value.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
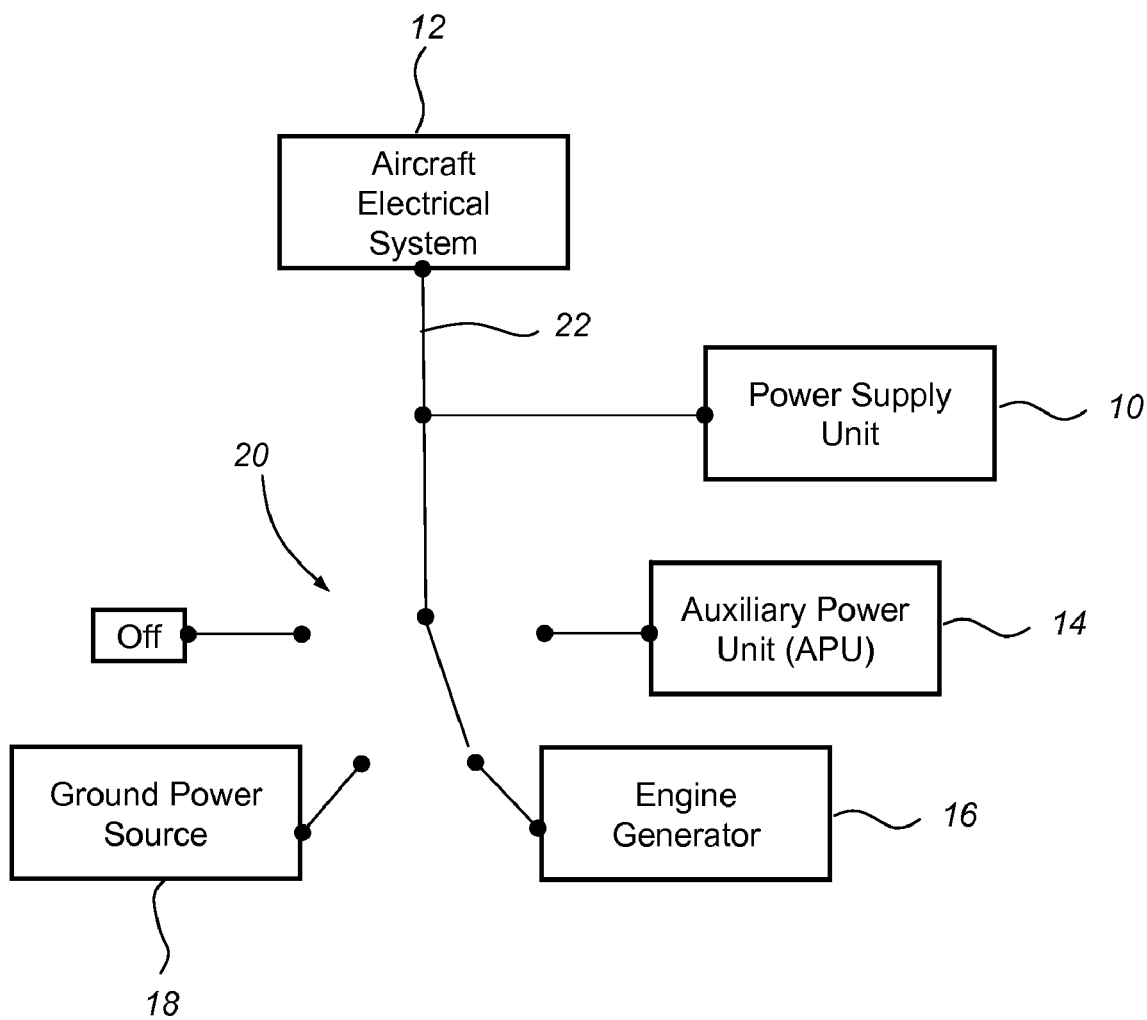
FIG. 1 is a schematic illustration of an exemplary fixed-wing aircraft application that can use the power supply unit described herein.

FIG. 1 schematically shows one example of an application that can use the uninterruptible power supply unit 10 described herein, and generally includes an aircraft electrical system 12 connected to a variety of electrical power sources 14-18 via a switching device or contactor 20. These sources include an APU 14, engine generator(s) 16, and ground power source 18. Contactor 20, which can either be a manually or automatically operated component, is schematically shown here as a four-position switch, but it could certainly be provided according to one of a number of different embodiments known in the art. Although the following description is provided in the context of a fixed-wing aircraft application, it should be appreciated that it is possible for power supply unit 10 to be used in a variety of other applications, such as those involving rotary-wing aircraft, spacecraft, etc.

According to this particular example, contactor 20 provides aircraft electrical system 12 with electrical power selected from one of the power sources 14-18, depending on the particular circumstances. To avoid loss of power during switchover between the different sources, power supply unit 10 is provided and is coupled to an aircraft power bus 22 where it operates as an auxiliary power supply during periods of interruptions.

Figure 2:
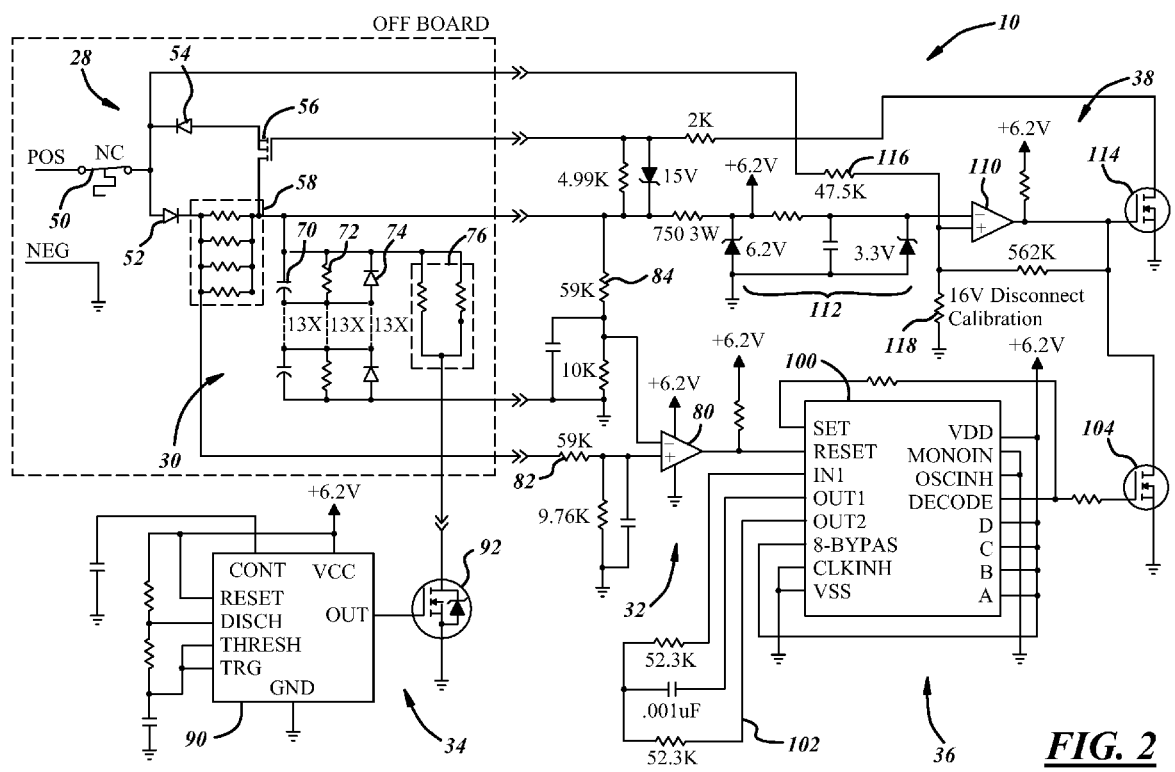
FIG. 2 is a schematic representation of an embodiment of the power supply unit shown in FIG. 1.

Turning now to FIG. 2, there is shown a schematic representation of an exemplary embodiment of power supply unit 10, which is designed to provide aircraft electrical system 12 with uninterrupted power, particularly during periods of break-before-make connections, and generally includes a connection circuit 28, an energy storage circuit 30, a comparator circuit 32, a pulse circuit 34, a time delay circuit 36, and a low voltage lockout circuit 38. It should be appreciated that the term 'circuit', as used with the foregoing exemplary circuits 28-38, can include any combination and arrangement of electrical components and can be implemented with or without the use of traditional circuit boards. According to one embodiment, most portions of circuits 30-38 are mounted to a circuit board, such as a printed circuit board (PCB), although some components may be mechanically fastened to the inside of a housing or enclosure and 'hard-wired' to the circuit board for thermal management reasons. Again, this is only one exemplary arrangement as numerous others are possible.

Connection circuit 28 includes both a charge and discharge path extending between power supply unit 10 and the aircraft power bus 22 and, according to one embodiment, generally includes a thermal switch 50, diodes 52, 54, a switching device 56, and an input impedance 58. Thermal switch 50 can be used to open connection circuit 28 (ie—disconnect the charge and discharge paths) if an excessive thermal event is detected somewhere in power supply unit 10. According to one arrangement, temperature sensors such as thermocouples are strategically placed throughout power supply unit 10 and activate thermal switch 50 in the event that the sensed temperature exceeds a predetermined threshold. A common location for such temperature sensors is near input impedance 58 and/or energy storage circuit 30. Diodes 52 and 54 direct the flow of current in the charge and discharge paths, respectively, and are designed to accommodate an adequate amount of current for the particular application (80 amps in this example). Because the diodes are passive electrical components (ie—they do not require any external power for operation), they tend to make charge and discharge paths more reliable than other arrangements that use more complex arrangement of both passive and active components. Furthermore, diodes 52 and 54 have a relatively small voltage drop across their terminals (typically about 0.2 volts), which results in power supply unit 10 being able to charge to a level that is near the voltage level on the aircraft power bus 22. As an example, if the aircraft power bus is being maintained at 28 volts DC, then energy storage circuit 30 is able to charge to about 27.4 volts (28.0 volts–0.2 volts (due to diode 52)–0.1 volts (due to input impedance 58 when circuit 30 is fully charged)–0.3 volts due to impedance 76 at 50% duty cycle as discussed below). Prior art systems that include more complex arrangements of active and passive components in their charge and discharge paths may only be able to charge to around 26-27 volts because of the increased voltage drops across each of the components. Likewise, the voltage level that can be outputted to the aircraft power bus 22 via the discharge path is quite high; about 27.0 volts (27.4 volts–0.2 volts (due to switching device 56)–0.2 volts (due to diode 54)). This outputted voltage level is higher than in most systems that have various passive and active components in their discharge paths. In addition, diodes 52 and 54 also protect power supply unit 10 from certain reverse polarity situations.

Switching device 56 can include one of a number of different types of electronic switching devices and switching arrangements, including P-channel field effect transistors (FETs), and controls the operational state of the discharge path. For instance, in certain situations where power supply unit 10 determines that it is undesirable to supply the aircraft power bus 22 with power, switching device 56 is turned off so that current is prevented from flowing through the discharge path. Input impedance 58 can be provided as a single resistor or as a multi-resistor arrangement, like that shown here. The embodiment shown in FIG. 2 includes four 4Ω, 50 W resistors wired in parallel to have an effective resistance of 1Ω, however, input impedance 58 could have other arrangements that exhibit more or less resistance than this example. It should be recognized that according to the embodiment shown here, connection circuit 28 is the only electrical connection between power supply unit 10 and the aircraft power bus 22. This single electrical connection arrangement can result in simpler installation and removal of the power supply unit, reduced maintenance expenses, lower costs associated with reconfiguring the aircraft's systems, and improved reliability and performance, to name but a few advantages.

Energy storage circuit 30 is electrically coupled to connection circuit 28 and includes one or more energy storage devices, such as capacitors, so that it can receive energy from electrical power sources 14-18. According to the embodiment shown here, energy storage circuit 30 includes a number of 350 F/2.5 v capacitors 70, 4.7 KΩ resistors 72, and 30A diodes 74 wired in both series and parallel configurations, as well as a 40Ω resistive element 76 (formed by two 80Ω, 50 W resistors). Stated differently, the energy storage circuit can include capacitor 70, resistor 72, and diode 74 wired together in parallel so that they form a single unit; that unit is in turn is wired in series to one or more additional units, thus forming the structure shown in FIG. 2. According to this example, a total of thirteen of these capacitor/resistor/diode units are wired together, as is appreciated by those skilled in the art. Resistive element 76 is connected to input impedance 58 so that the two components can operate as a voltage divider of sorts. It should be pointed out that in this embodiment, energy storage circuit 30 generally acts as a passive charging and discharging circuit that is more reliable and applicable in certain aerospace applications than comparable circuits having more complex arrangements of passive and/or active component.

Comparator circuit 32 is electrically coupled to connection circuit 28 and energy storage circuit 30, and generally determines if there is adequate voltage on the aircraft power bus 22. According to the particular embodiment shown here, comparator circuit 32 generally includes a comparator 80 and a host of individual electrical components. As is commonly known in the art, comparator 80 can be a standard op-amp that compares the voltage on its non-inverting input (+ input) to that on its inverting input (– input) and outputs a signal indicating which is larger. According to this embodiment, the non-inverting input of comparator 80 is coupled to connection circuit 28 via a high impedance resistor 82 (59KΩ in this example) so that the voltage at the non-inverting input is representative of the voltage on the aircraft power bus 22. The inverting input, on the other hand, is coupled to energy storage circuit 30 via a high impedance resistor 84 (also 59KΩ in this example) so that the voltage at the inverting input is representative of the voltage at a negative terminal of input impedance 58. If the aircraft power bus 22 is at an adequate voltage, then a voltage drop occurs across input impedance 58 due to the charging of energy storage circuit 30 and/or powering resistive element 76, as will be subsequently explained. This voltage drop in turn causes the voltage at the non-inverting input of comparator 80 to be higher than that at the inverting input, which results in comparator 80 outputting a high signal. If there is insufficient voltage on the aircraft power bus, such as during a power disruption, then there will not be a voltage drop across input impedance 58 which results in the inverting input having a higher voltage than the non-inverting input. This condition causes comparator 80 to output a low signal.

Pulse circuit 34 is electrically coupled to energy storage circuit 30 and is designed to reduce the amount of power used by power supply unit 10 during operation. As previously explained, the comparison performed by comparator 80 involves the voltage at the negative terminal of input impedance 58, which can indicate a voltage drop across that resistance. While useful for comparing voltages, this arrangement results in a loss of energy when there is sufficient voltage on the aircraft power bus 22 due to current flowing through input impedance 58 and resistive element 76 (a total of about 20 watts). Furthermore, this energy loss increases the amount of thermal energy given off by certain parts of power supply unit 10 (a total of about 20°-25° C. in temperature increase). To address these issues, pulse circuit 34 can open and close the ground path so that current is only flowing through resistive element 76 for a fraction of the time that it would if that element were simply wired to ground. According to the embodiment shown here, pulse circuit 34 generally includes a timer 90 operably coupled to a switching device 92. Timer 90 can be one of a number of electronic timers known to those skilled in the art, and is designed so that it provides an output signal to switching device 92 according to a predetermined frequency and duty cycle. Switching device 92 is preferably some type of transistor that has its gate tied to the output of the timer. According to one example, timer 90 outputs a signal with a frequency of about 5-15 Hz and a duty cycle of 10-30%, which should reduce the power losses from about 20 watts to about 2 watts and have a similar reduction in the associated temperature rise. In another example, a duty cycle of 50% increases power loss to about 10 watts, but in at least some low bus voltage situations, this higher duty cycle will discharge the storage capacitors 70 quicker, resulting in comparator 80 resetting the time delay circuit 36 sooner and thereby re-closing the switching device 56 faster.

Time delay circuit 36 is electrically coupled to comparator circuit 32 and is designed to distinguish when a loss of power on the aircraft power bus 22 is due to a temporary disruption, such as those occurring during break-before-make transitions, and when it is due to a desired shut down, like when an operator turns off the aircraft's electrical system. According to this embodiment, time delay circuit 36 generally includes a timer 100, an RC circuit 102, and a switching device 104. Timer 104 has an output connected to switching device 104 so that it can provide it with a control signal. At the expiration of a predetermined amount of time, which is preferably dictated by RC circuit 102 and divider circuitry within timer 100, the timer sends an output signal to switching device 104 that causes it to change its operational state. However, because the output of comparator 80 is coupled to a reset pin on timer 100, under normal operating conditions where there is sufficient voltage on the aircraft power bus 22, timer 100 is repeatedly reset before it can time out. Thus, switching device 104, which controls the state of the main discharge path through switching device 56, remains unchanged.

To illustrate, if time delay circuit 36 were set to a delay of four seconds and a temporary disruption resulting from a break-before-make event were to last 1 second, then comparator 80 would sense the decrease in voltage during the power disruption and would output a low signal to the reset pin of timer 100. Because the reset pin is being provided with a low signal, timer 100 would be allowed to run. At the expiration of one second, which occurs well before the timer expiration of four seconds, the voltage would be restored on the aircraft power bus 22 and comparator 80 would output a high signal to timer 100 in response. The high output would reset timer 100 before it could timeout so that switching device 104 keeps the discharge path connected via switching device 56. Conversely, if an operator or authorized system purposely shuts down the aircraft electrical system, the loss of power on the aircraft power bus 22 would exceed four seconds, resulting in switching device 104 turning off switching device 56 and thus disconnecting the discharge path. If time delay circuit 36 were not enabled as such, power supply unit 10 could continue to provide auxiliary power to the aircraft power bus 22, even though the aircraft electrical system had been purposely turned off. This discharging would continue until the energy storage circuit 30 was depleted of charge, which could result in an appreciable rise in the temperature and potentially take minutes or even hours for complete discharge.

Low voltage lockout circuit 38 is electrically coupled to time delay circuit 36 and connection circuit 28, and is designed to detect when the voltage on the aircraft power bus 22 falls below a predetermined threshold so that power supply unit 10 does not supply an otherwise insufficiently powered bus with power. Some power supply units are designed to supply the aircraft power bus with energy until they are completely depleted of stored energy, even if that entails supplying an insufficiently powered aircraft power bus with charge. Low voltage lockout circuit 38 generally includes a comparator 110, reference voltage circuitry 112, and a switching device 114, and disconnects the discharge path via switching device 56 when the voltage on the aircraft power bus 22 falls below a predetermined level. The non-inverting input of comparator 110 is coupled to connection circuit 28 via a voltage divider that includes high impedance resistor 116 and potentiometer 118 or another adjustable resistive device. Thus, the voltage seen at the non-inverting input is generally representative of the voltage on the aircraft power bus 22. The inverting input of comparator 110 is coupled to reference voltage circuitry 112 which provides the comparator with a known reference voltage. When the voltage on the aircraft power bus falls below the predetermined threshold, say 16 volts in the example where the aircraft power bus is typically at 28 volts, comparator 110 outputs a signal to the gate of switching device 114 that causes it to open switching device 56 and thus prevent power supply unit 10 from powering the aircraft power bus 22. In a sense, time delay circuit 36 and low voltage lockout circuit 38 operate together as an 'OR' function; if either a timeout or a low voltage situation occurs, then the respective circuit shuts down the discharge path of power supply unit 10 by opening switching device 56.

Another feature of this arrangement is that power supply unit 10 has a built in short circuit fault detection. If a short occurs somewhere on the aircraft power bus 22, it is usually desirable to limit the amount of current provided to the short by power supply unit 10. Typically, a current sensing resistor and accompanying circuitry is needed, however, the present power supply unit 10 accomplishes this with its existing circuitry. In the event of a short, the aircraft power bus voltage will fall until the voltage sensed at the non-inverting input of comparator 110 falls below the predetermined threshold (16 volts in the previous example). At this point, comparator 110 outputs a signal to switching device 114 that causes it to turn off switching device 56 and effectively stop power supply unit 10 from sending anymore current to the short circuit. Without this short circuit fault detection feature in place, as much as 600 amps could flow from power supply unit 10, but with the feature in place that current is reduced to about 290 amps. Additionally, the short circuit fault detection feature results in a shortened duration since energy storage circuit 30 only discharges until the aircraft power bus voltage falls below the threshold, at which point it stops discharging and retains its remaining charge.

Power supply unit 10 can be encased within one of a number of different types of housings or enclosures known in the art. One such housing is an elongated, generally cylindrical vessel that is hermetically sealed so that the contents of the power supply unit 10, particularly those of capacitors 70, can be contained in the event of a leak. According to one embodiment, the various resistors of input impedance 58 can be separated from one another and placed at different locations within the housing. To use the example provided above, if the four 1Ω resistors were placed together, their combined exothermic properties could create a hot spot or otherwise impede the thermal management of the device. Thus, the four 1Ω resistors are preferably separated from each other (ie— one in each corner of the housing, two on one end of the housing and two on the other, etc.).

In operation, beginning with a situation where the aircraft power bus 22 is at a normal operating voltage (for example 28 volts), power supply unit 10 is generally in a charging mode. Current flows through the charge path of connection circuit 28, across input impedance 58 and charges the various capacitors 70 so that they can fully charge. During the 'low' or 'off' periods of the duty cycle of timer 90, there is no ground path for current flowing through input impedance 58 because switching device 92 is closed (this results in the energy and temperature reductions explained above). Therefore, there is no voltage drop across input impedance 58 which causes comparator 80 to output a low signal. The low signal on reset pin allows timer 100 to run. However, the frequency of timer 90 is significantly greater than that of timer 100 (timer 90 times out every 100 ms, timer 100 times out every 4 s). At the end of 100 ms, a ground path is established through switching device 92 and hence across input impedance 58, which causes comparator 80 to reset timer 100. Because timer 100 is being reset every 100 ms it does not have a chance to timeout, thus the power supply unit keeps the main discharge path open through switching device 56. It should be appreciated that while pulse circuit 34 is advantageous for reducing the amount of energy used and heat generated by power supply unit 10, the pulse circuit 34 could be omitted such that the power supply unit is operated without it.

Turning now to a situation where there is a temporary disruption on the aircraft power bus 22, (for example the power bus dips to 10 volts for a period of 1 second), power supply unit 10 starts a timer but supplies power to aircraft power bus in the meanwhile. If power is restored after 1 second, then comparator 80 will go back to sending a reset signal to timer 100 so that its internal timing operations are reset. Because the power supply unit 10 has recognized that the power disruption was only temporary, it continued to provide power to the aircraft power bus in an uninterrupted manner. If, on the other hand, the power was not restored within four seconds, then the power supply unit would recognize that the power disruption was likely not inadvertent and would accordingly would disconnect the discharge path by opening up switching device 56. It should be recognized that the default state of the discharge path through switching device 56 and diode 54 is that it is normally connected. Stated differently, the discharge path is generally on until it is turned off, this way if there is a sudden disruption in power on the aircraft power bus 22 the discharge path is already connected and ready to supply power, as opposed to having to be turned on in response to such a condition.

Turning now to a situation where the voltage on the aircraft power bus 22 falls below a certain predetermined threshold, power supply unit 10 disconnects the charge path as it is usually preferred that the power supply unit provide no power to bus 22 in that case. Once the aircraft power bus voltage falls below the threshold, comparator 110 triggers switching device 114 to disconnect the discharge path via switching device 56.

Although the embodiment shown in FIG. 2 has switching devices 104 and 114 tied to each other, it is of course possible for these components to be autonomous of one another and be individually coupled to switching device 56.

Similarly, if there is a short on the aircraft power bus 22, there is likely to be a rapid decline in the voltage of the aircraft power bus. This results in a decrease in the voltage seen at the non-inverting input of comparator 110, as already explained. Once the voltage falls below the threshold determined by reference voltage circuitry 112, comparator 110 instructs the switching device 114 to disconnect the charge path through switching device 56. As previously explained, this feature acts as a short circuit fault protection.

From the foregoing, it will be appreciated that, by monitoring the aircraft bus voltage relative to the stored charge, a loss of power on the bus can be automatically detected by the power supply unit 10, and by using the timer circuit 36, the power unit 10 can distinguish between temporary loss of power due to switchovers of the bus between power sources versus complete switching off of the bus power altogether. In this way, the power supply 10, with its two wire connection to the aircraft, can keep the aircraft bus supplied with continuous power during switchovers, while shutting off power to the bus when a true turnoff of bus power is done (e.g., by contactor 20 being switched to the off position). Furthermore, the combination of steering diodes 52, 54, input impedance 58, and switching device 56 allows for a simplified, reliable charge and supply path for the power supply unit 10, and by maintaining switching device 56 normally on (conductive), UPS power is instantaneously available in the event of a drop or loss of voltage on the aircraft bus. And, by monitoring the voltage at nodes located at opposite ends of the input impedance 58, the power supply unit is able to determine the state of the aircraft bus and control operation of the switching device 56 accordingly.

It is to be understood that the foregoing description is not a definition of the invention itself, but a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments, changes and modifications to the disclosed embodiment(s) will become apparent to those skilled in the art. For example, although power supply unit 10 is shown having circuits 28-38, numerous other embodiments having different combinations of circuits 28-38 are possible. Some of these other embodiments could include combinations that have fewer circuits than those shown here, while others may incorporate additional known circuits to those shown in FIG. 2. Furthermore, the specific component values and schematic design disclosed herein are given to provide a specific example of an embodiment that can be used for one particular application—a 28 volt DC power bus for use with an aircraft electrical system. Other applications will use other components, component values, and circuit designs. Although the foregoing description has been in the context of a power supply unit 10 connected to an aircraft power bus 22, it is possible to connect the power supply unit to some other section of the aircraft electrical system 12. All such other embodiments, changes, and modifications are intended to come within the scope of the appended claims.

As used in this specification and claims, the terms "for example," "for instance," "like" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A power supply unit for use with an aircraft power bus, comprising:
   a connection circuit being electrically coupled to the aircraft power bus and providing the power supply unit with both charge and discharge paths;
   an energy storage circuit being electrically coupled to the connection circuit, wherein during charging periods the energy storage circuit receives charge from the aircraft power bus through the charge path, and during discharging periods the energy storage circuit provides charge to the aircraft power bus through the discharge path;
   a comparator circuit that is electrically coupled to the energy storage circuit and that determines if there is adequate voltage on the aircraft power bus; and
   a time delay circuit that is electrically coupled to the comparator circuit and that, in response to a determination by the comparator circuit that there is inadequate voltage on the aircraft power bus, distinguishes when a loss of power on the aircraft power bus is due to a temporary disruption and when it is due to a desired shut down.

2. The power supply unit of claim 1, further comprising a pulse circuit that is electrically coupled to the energy storage circuit and reduces the amount of power used by the power supply unit during operation.

3. The power supply unit of claim 1, further comprising a low voltage lockout circuit that is electrically coupled to the connection circuit and detects when the voltage on the aircraft power bus falls below a predetermined threshold.

4. The power supply unit of claim 3, wherein the low voltage lockout circuit also acts as a short circuit fault detection.

5. A power supply unit for use with an aircraft power bus, comprising:
   a connection circuit having positive and negative input terminals for connecting to two corresponding terminals of an aircraft power bus; and
   an energy storage circuit electrically connected to said connection circuit;
   wherein said connection circuit provides separate charging and discharging paths between said input terminals and said energy storage circuit, and wherein said connection circuit includes an impedance in said charging path and a switch in said discharge path; and
   wherein said power supply unit includes circuitry that controls operation of said switch based on voltage differences between two nodes located at opposite ends of said impedance.

6. The power supply unit of claim 5, wherein the connection circuit includes at least one diode in each of the paths.

7. The power supply unit of claim 5, wherein the switch is normally maintained in an on state such that power from the energy storage circuit can be instantaneously supplied to the aircraft power bus during switchovers of bus power from different aircraft power sources.

8. The power supply unit of claim 5, further comprising a low voltage lockout circuit that is electrically coupled to the connection circuit and detects when the voltage on the aircraft power bus falls below a predetermined threshold.

9. The power supply unit of claim 5, wherein said switch comprises a transistor.

10. The power supply unit of claim 5, wherein said input terminals are the only electrical connections on said power supply unit.

11. A power supply unit for use with an aircraft power bus, comprising:
   a connection circuit having positive and negative input terminals for connecting to two corresponding terminals of an aircraft power bus; and
   an energy storage circuit electrically connected to said connection circuit;
   wherein said connection circuit provides separate charging and discharging paths between said input terminals and said energy storage circuit, and wherein said connection circuit includes an impedance in said charging path and a switch in said discharge path;
   wherein said power supply unit includes circuitry that controls operation of said switch based on voltage differences between two nodes located at opposite ends of said impedance; and
   wherein said energy storage circuit comprises a plurality of energy storage devices and a second impedance defining a path in parallel with said energy storage devices.

12. The power supply unit of claim 11, wherein said energy storage devices comprise capacitors.

13. The power supply unit of claim 11, further comprising a pulse circuit in series with said second impedance to switch said impedance in and out of circuit at a selected duty cycle.

14. A power supply unit for use with an aircraft power bus, comprising:
   a connection circuit having positive and negative input terminals for connecting to two corresponding terminals of an aircraft power bus; and
   an energy storage circuit electrically connected to said connection circuit;
   wherein said connection circuit provides separate charging and discharging paths between said input terminals and said energy storage circuit, and wherein said connection circuit includes an impedance in said charging path and a switch in said discharge path;
   wherein said power supply unit includes circuitry that controls operation of said switch based on voltage differences between two nodes located at opposite ends of said impedance; and
   wherein said power supply unit further comprises a comparator circuit and a timer delay circuit that controls operation of said switch, said comparator circuit being electrically connected to the nodes and having an output electrically connected to an input of the timer delay circuit, and wherein said comparator circuit and said timer delay circuit together operate to turn off said switch if the aircraft power bus has lost power for more than a selected amount of time.

15. The power supply unit of claim 14, wherein said comparator circuit and a timer delay circuit together comprise the circuitry that controls operation of said switch based on voltage differences between the to nodes.

* * * * *